United States Patent [19]

Oba et al.

[11] Patent Number: 5,825,001
[45] Date of Patent: Oct. 20, 1998

[54] FUNCTION CALCULATOR WITH GRAPHIC CHART FACILITY

[75] Inventors: Toshiro Oba; Kawawaki Fumiaki, both of Nara, Japan

[73] Assignee: Sharp Kabushiki Kaisha, Osaka, Japan

[21] Appl. No.: 742,088

[22] Filed: Oct. 31, 1996

[30] Foreign Application Priority Data

Dec. 22, 1995 [JP] Japan ................................ 7-335482

[51] Int. Cl.$^6$ .............................. G06C 3/00; G06F 3/00
[52] U.S. Cl. ................................. 235/85 R; 364/710.01
[58] Field of Search .............................. 235/85 R, 61 B; 364/706, 709.12, 710.01, 710.14, 715.01, 718.08; 395/128, 129, 140, 501, 507

[56] References Cited

U.S. PATENT DOCUMENTS

| | | | |
|---|---|---|---|
| 4,794,554 | 12/1988 | Tamiya ................................ | 364/710.01 |
| 4,908,786 | 3/1990 | Kuno ................................... | 364/710.11 |
| 5,210,708 | 5/1993 | Negishi ............................... | 364/710.14 |
| 5,303,338 | 4/1994 | Handa et al. ........................ | 395/140 |
| 5,539,867 | 7/1996 | Handa et al. ........................ | 395/140 |

FOREIGN PATENT DOCUMENTS 4-219858  8/1982  Japan .
61-276052 12/1986 Japan .

*Primary Examiner*—Matthew V. Nguyen
*Attorney, Agent, or Firm*—David G. Conlin; Brian L. Michaelis

[57] ABSTRACT

In tracing a functional equation, a maximum value of the functional equation and an intersection with another functional equation can be recognized on a graph of the functional equation. Coordinate values of any traced dot may include an intersection point discriminated to be a true intersection point or not. An intersection point between dots to be traced, can be traced with the trace interval changed to be finer than the display interval. The tracing cursor indicates specific points by a change in a color and/or shape of the cursor. A point intersection between different functions is determined on the basis of a difference value between traced values of respective functions.

3 Claims, 6 Drawing Sheets

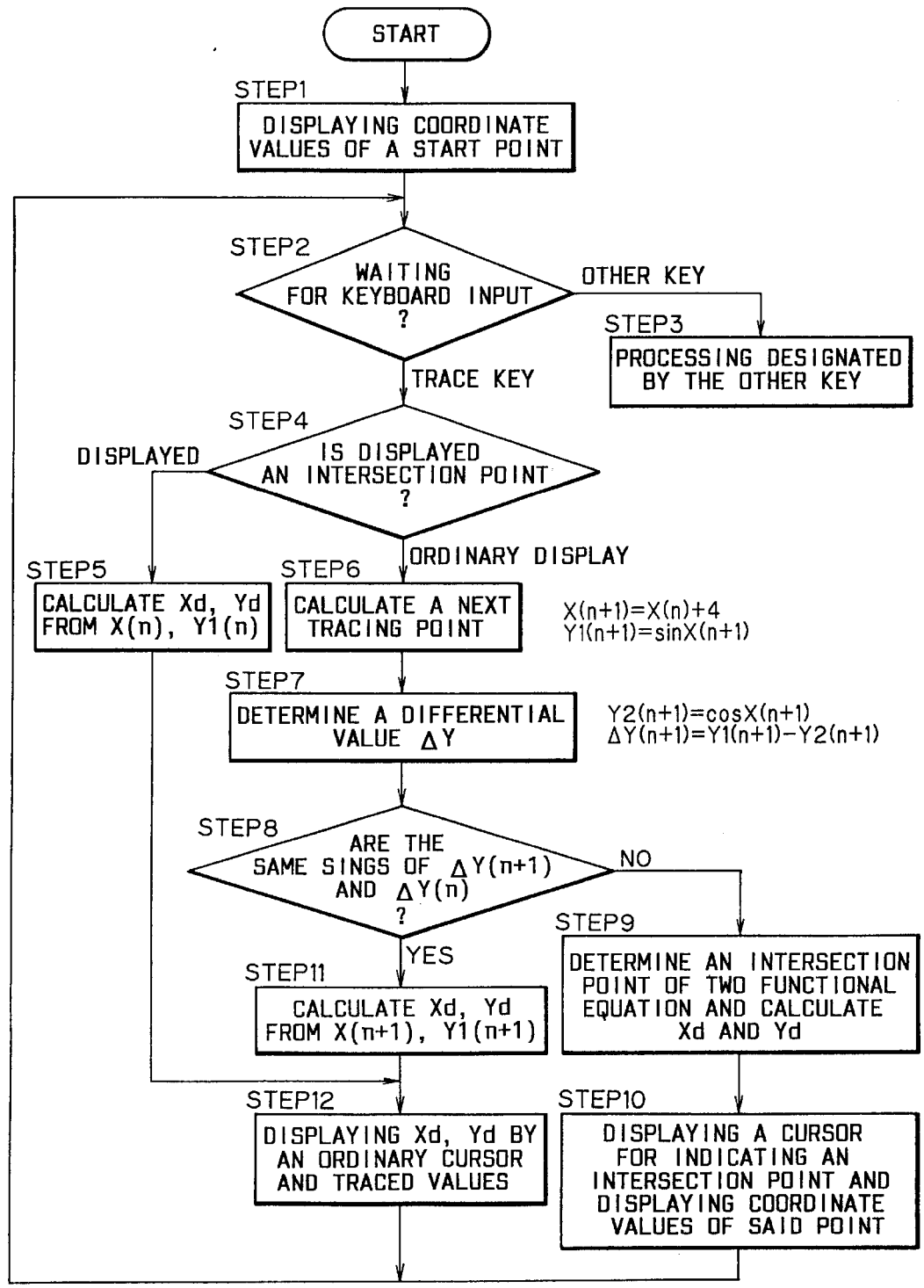

|IMAGE ON DISPLAY SCREEN | REGISTERS |
|---|---|

X(0)=37
Y(0)=0.60815
ΔY(0)=−0.197

X(1)=41
Y(1)=0.65606
ΔY(1)=−0.099

X(2)=45
Y(2)=0.70711
ΔY(2)=0

FUNCTION CALCULATOR WITH GRAPHIC CHART FACILITY

BACKGROUND OF THE INVENTION

Representative examples of conventional graph tracing devices which can indicate a moving cursor on a graph indicated on a display screen and current coordinate values of the cursor on the graph are as follows:

1) Coordinate values of a pointer (point cursor) on a curve of a graph are calculated and indicated by flashing, the pointer is moved and displayed in a designated direction at a specified interval by using a moving key, a graph and its tracing is displayed by simple key operations (This method is disclosed in Japanese Laid-Open Patent Publication No. 61-276052).

2) Tracing can be accelerated to a desired point by moving a pointer at any moving interval selected from different preset values (This method is disclosed in Japanese Laid-Open Patent Publication No. 4-219858).

The above-mentioned conventional methods, however, can not trace a point that may be an essential feature point existing between two successive tracing points on a functional equation even if a pointer could be moved a smallest selectable interval for determining coordinate values of the pointer on a graph because any tracing point is limited by the coordinates of the pointer.

When a pointer (cursor) indicates an intersection point of two curves (graphs) on the display screen, it may indicate another point neighboring to the intersection point, i.e., the coordinate values of the actual tracing point may be slightly different from the intersection point. This may result from coarse size of dots composing the graph displayed on the screen.

There has been also proposed a tracer that has, besides ordinary tracing facility, a facility of tracing only intersection points but requires switching a control frequently. This is troublesome in practical use.

SUMMARY OF THE INVENTION

The present invention relates to a function calculator with a graphical facility and, more particularly, to a functional equation tracing system that can be used for function electronic calculators with a graph tracing facility, pocket computers and so on, and directed to provide a function calculator having a graph tracing facility, which is capable of tracing a graph of a functional equation, indicating a maximum value, a minimum value, an inflection point of the functional equation and a point of intersection of the equation with another functional equation on the graph, and also of clearly indicating whether the intersection point is correct or not.

An object of the present invention is to provide a function calculator with a graph tracing facility according to the present invention, which is capable of tracing an input functional equation, determining traced values, displaying a graph of the input functional equation on the basis of the input functional equation and the traced values, indicating thereon a tracing point by a cursor and presenting numerical indication of the traced values, wherein a discrete interval (space) of coordinates of respective traced points to be numerically indicated can be determined more accurately than that of the coordinates of respective tracing points to be indicated by a cursor in such a manner that when a point satisfying preset conditions of an intersection point is found between a current tracing point and a next tracing point, which space will not be usually traced, said point is newly set as a next tracing point and its coordinates will be indicated. Namely, numerically indicated coordinates of the intersection point accurately traced and the traced values determined two times (at a specified constant interval and at an intersection point) and numerically displayed, that eliminates the possibility of taking the result of a constant interval tracing for an intersection point even when the cursor looked to exists at the intersection point on the graph.

Another object of the present invention is to provide a function calculator with a graph tracing facility according to the present invention, which is capable of tracing an input functional equation, determining traced values, displaying a graph of the functional equation on the basis of the input functional equation and the traced values, and indicating a traced point by a cursor on the graph and numerically indicating the traced values, wherein the cursor may change its color and/or shape to visually represent that the traced values agree with preset conditions defining a maximum value, minimum value and inflection point of the functional equation and an intersection point with another functional equation and the traced point is checked to agree with the preset conditions or not: the cursor having an ordinary color and a standard shape is displayed if the traced point did not agree with the preset conditions, and the cursor changes its color or shape if the point meets the preset conditions. By so doing, an intersection point can be visually discriminated to be a true intersection point or a point neighboring to the true intersection.

The further object of the present invention is to provide a function calculator as defined in the second object, wherein in case of processing a plurality of functional equations $Y=f(X)$ with intersection points disposed therebetween as the preset conditions, discrimination is made by applying a differential value of $\Delta Y$ of traced values of the respective functional equations.

BRIEF DESCRIPTION OF DRAWINGS

FIG. 3 is a flow chart for explaining an embodiment of the present invention.

DESCRIPTION OF THE PREFERRED EMBODIMENTS

Figure 1:
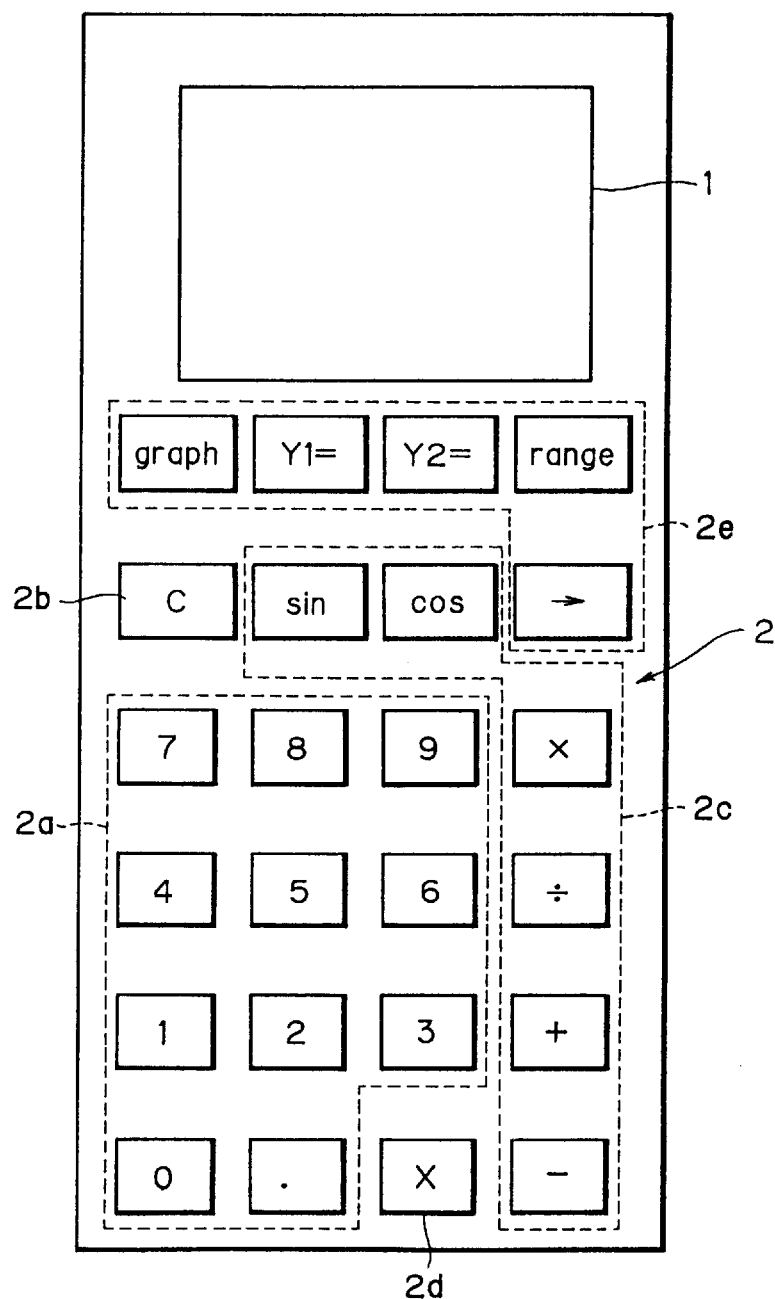
FIG. 1 is an external view of an electronic calculator with a graph tracing facility, whereto the present invention is applied.

Referring now to FIG. 1, there is shown an external view of an electronic calculator with a graph tracing facility, to which the present invention is applied and which is composed of two portions—a display portion (LCD) 1 and a keyboard portion 2. The display portion 1 is a liquid crystal display portion of 96×64 dots for displaying input values and results of arithmetic operations. The keyboard portion 2 consists of the following keys: Keys 2a ([0], [1], [2], [3], [4], [5], [6], [7], [8], [9], [.]) are used for entering numerical values. A key 2b [C] is used for initializing the state of the calculator and keys 2c ([sin], [cos], [×], [÷], [+] and [−]) are operational keys for execution of calculations. A key 2d [×] is used for designating a variable of a graph, keys 2e ([Y1=], [Y2=]) are used for designating a graphic equation, a key [graph] is used for execution of graph plotting, a key [range] is used for designating a graph range and a key [→] is used for tracing.

Figure 2:
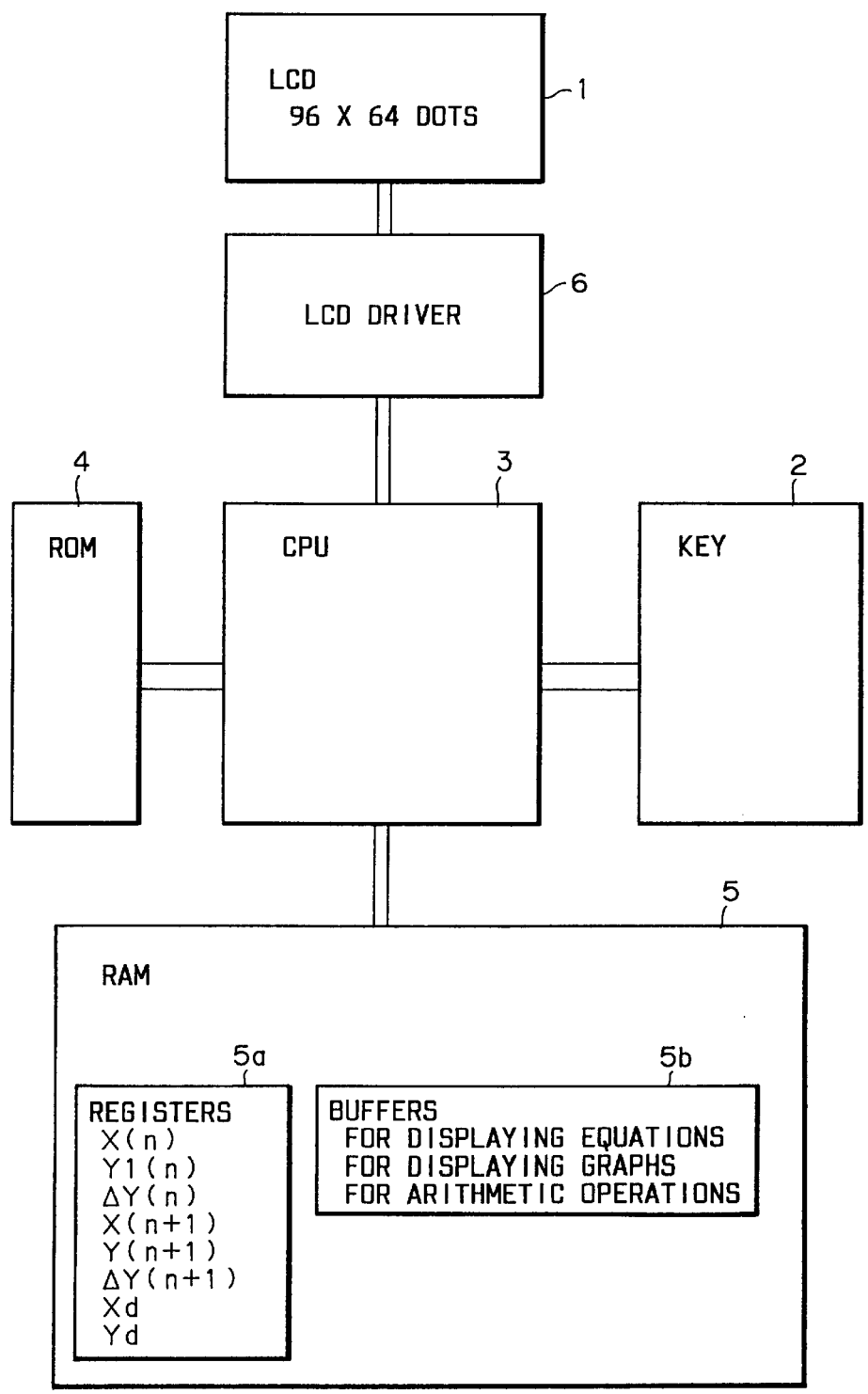
FIG. 2 is a block diagram showing an entire system of the electronic calculator shown in FIG. 1.

FIG. 2 is a block diagram showing an entire system of the electronic calculator shown in FIG. 1. A central processing unit (CPU) 3 controls the activities of keyboard inputting, calculation, display, graph plotting and graph tracing. Numeral 4 designates a read-only memory (ROM) for storing programs for control of operations, i.e., keyboard input, calculation, display, graph plotting and graph tracing and numeral 5 designates a random access memory (RAM) for storing information necessary for controlling operations, i.e., keyboard input, calculation, display, graph plotting and graph tracing. The RAM 5 includes registers 5a for storing results of various kinds of calculations and buffers 5b used for displaying a calculating expression and graph and storing data for calculation. Numeral 6 is a driver of LCD for displaying input information, calculation results and a graph being plotted.

The following embodiment will be explained by way of example in the case of recognizing the coincidence of traced values with the preset conditions of a point of two functional equations. These conditions can be given as various kinds of features of the functional equation, e.g., an intersection with a x-axis, an intersection with a y-axis, a maximum value, a minimum value, inflection point and the like, and either a single condition or a plurality of conditions may be easily preset.

Operations for inputting a functional equation, plotting a graph, tracing the functional equation and displaying coordinate values of a tracing cursor are usually performed with graph-function calculators and therefore will not be explained.

FIG. 3 is a flow chart for explaining an embodiment of the present invention when recognizing a point at which two functional equations Y1=sin X and Y2=cos X are intersects in the process of tracing the functional equation Y1=sin X. The operation is as follows:

Tracing will be performed at a specified space between two points relative to the x-axis, which corresponds to a size of one dot on a display screen. Accordingly, a cursor moves every one-dot width of 4 degrees from a start point 38° on the x-axis to an end point 414° on the x-axis.

A lower limit value on the y-axis is set at −1.55 and an upper limit value on the y-axis is set at 1.55. One dot has a value of 0.05 relative to the y-axis. Such dots compose a graph of the functional equation.

At Step S1, the trace key is first pressed to indicate a cursor at a position (Xd, Yd) corresponding to a value Y1 (Y=0.61566) at the start point (X(0)=38°) and then the process advances to Step S2 for waiting for key operation.

At Step S2, the process proceeds to Step S3 if a key other than the trace key is pressed and it advances to Step S4 when the trace key is pressed.

At Step S3, processing designated by the pressed key is executed. This processing is not described here.

At Step S4, a judgment is made on whether a current displayed tracing point represents an intersection point or not: a next tracing point is calculated at an ordinary discrete space (interval) or a precedent traced point which was determined at an ordinary discrete space is read-out (because the current indicated traced point has been determined at a more accurate discrete space). The process proceeds to Step 5 when the point represents the intersection point. Otherwise the process proceeds to Step S6.

At Step S5, values X(n) and Y(n) determined at ordinary discrete space at Step S6 is read-out to take the place of the current displayed traced point having a more accurate discrete space and representing the intersection point, and a location of a dot corresponding to the read-out values on the display screen, i.e., the dot location (Xd, Yd) is calculated, then the process proceeds to Step S12.

At Step S6, a value of a proceeding tracing point X(n+1) is determined at the ordinary discrete space and a value Y1 corresponding to the value of the point X(n+1), then the process proceeds to Step S7.

At Step S7, a value Y2 is determined by using the value of the point X(n+1) determined at Step S6, a differential of two functional equations, i.e., $\Delta Y(n+1)=Y1-Y2$ is calculated and then the process proceeds to Step S8.

At step S8, the (positive or negative) sign of $\Delta Y(n+1)$ obtained by the present routine is checked for coincidence with that of $\Delta Y(n)$ determined by the precedent routine. When the signs of both defferentials are the same, no intersection point of two functional equations exists between the precedent traced point and the current tracing point. In this instance, the process advances to Step S11. If the two differentials have different signs, these two functional equations have a intersection point between the precedent traced point and current tracing points. The process proceeds to Step S9.

At Step S9, an intersection of the two functional equations, which exists between the precedent traced point X(n) and the current tracing point X(n+1), is located at a more fine discrete space and the values Xd and Yd of the found intersection point are calculated and then the process proceeds to Step S10. The method for determining an intersection point is commonly used in conventional graph function calculators.

At Step S10, the intersection point is shown by a special cursor being different in color and shape from the ordinary cursor and coordinate values of the intersection point is also indicated. The process then returns to Step S2.

At Step S11, Xd and Yd are calculated from X(n+1) and Y1 and, then, the process advances to Step S12.

At Step S12, a point designated by Xd and Yd is displayed by the ordinary cursor, the coordinate values are indicated and then the process returns to Step S2.

Thus, the shown embodiment can trace any intersection point existing within a normally-untraceable specified discrete-space by manipulating only the trace key with applying a finer discrete space.

FIG. 4 is illustrative of display screen images when tracing from a 38°-point to a 46°-point on a functional equation Y1=sin X according to the flow chart shown in FIG. 3, with enlarged views of the pointed portions and indication of various parameter values stored in registers. Each display-screen image represents an entire screen image of the display portion 1, whereon two curves of Y1=sin X and Y2=cos X, a cursor on the curve of Y1=sin X and coordinate values of a tracing point are displayed.

Each enlarged view of a portion pointed by the cursor shows unit dots with numerical indication of locations of the dots. Dots composing curves of both functional equations are shown in form of a black rectangle. A white rectangle shows a flashing pointer (cursor).

There are shown registers for storing coordinate values X(n), Y(n), a difference ΔY between Y1 and Y2, a location (Xd, Yd) of a displayed dot corresponding to (X(n), Y(n)).

Figure 4A:
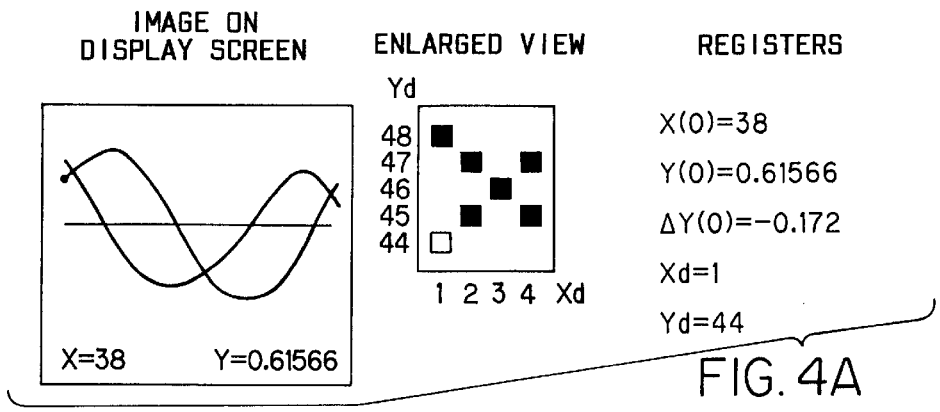
FIGS. 4A–4D are illustrative of a display screen image when tracing a functional equation $Y1=\sin X$ according to the flow chart shown in FIG. 3.

FIG. 4(A) depicts the beginning of tracing the graph with a cursor disposed at the left end of the desired functional equation. Coordinate values of current tracing point are represented as X=38 and Y=0.61566.

Figure 4B:
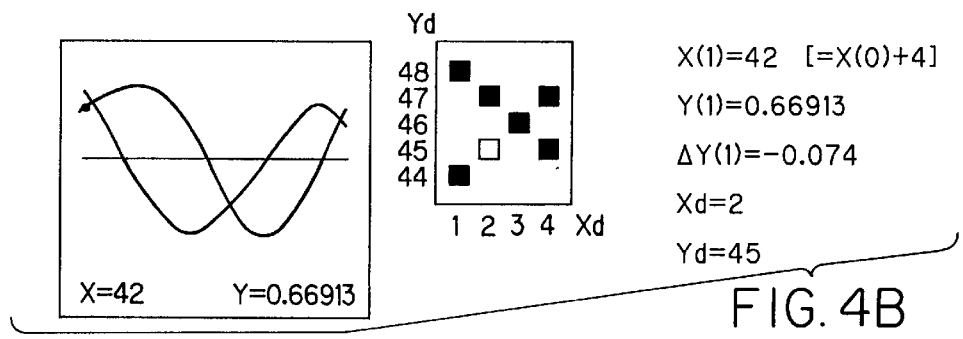

FIG. 4(B) depicts a state of ordinary tracing conducted with a regular increment of 4 for X-value. This corresponds to Step S12 in the case of taking a course of Steps S2, S4, S6, S7, S8, S11 and S12 of the flow chart shown in FIG. 3. In this case, X=42 and Y=0.66913 are indicated.

Figure 4C:
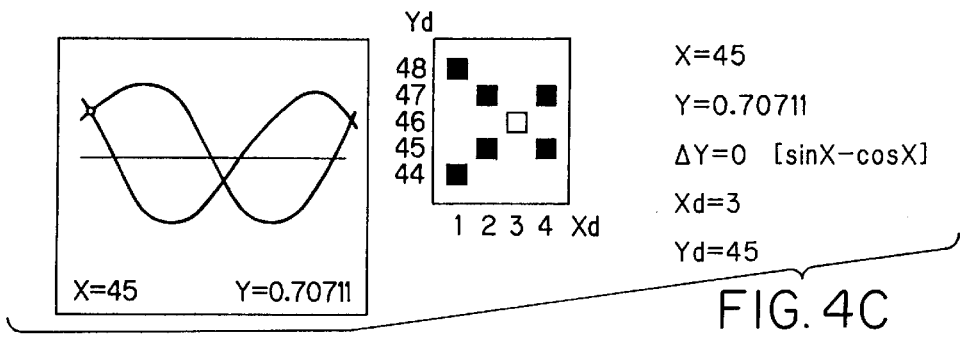

FIG. 4(C) depicts the state of tracing an intersection point existing in the space to a next tracing point. This state corresponds to Step S10 in the case of taking a course of Steps S2, S4, S6, S7, S8, S9 and S10 of the flow chart shown in FIG. 3. X=45 and Y=0.70711 are also shown on the screen. In this case, the cursor is shown at the same position on the screen as an ordinary cursor of FIG. 4(D) but differs from the ordinary cursor by its shape.

Figure 4D:
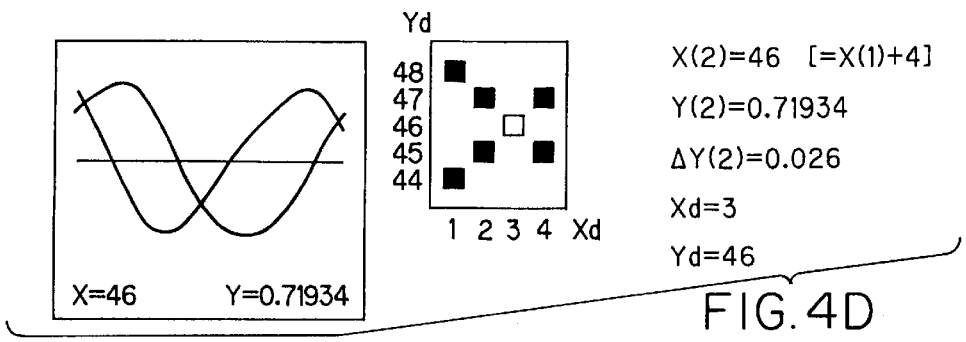

FIG. 4(D) depicts the state of tracing after displaying the intersection point, which state corresponds to Step S12 in the case of taking a course of Steps S2, S4, S5 and S12 of the flow chart shown in FIG. 3. In this case, X=46 and Y=0.71934 are indicated. Although the pointer exists at the same position as the pointer shown in FIG. 4(C), it can be recognized not to be an intersection point of two functional equations since said intersection point was already detected.

As described above, the embodiment can discriminate a difference between a discrete space of the displayed cursor position and a discrete space of coordinate values of a tracing point and can also adjust a discrete space of coordinate values to be finer as the need be.

Figure 5:
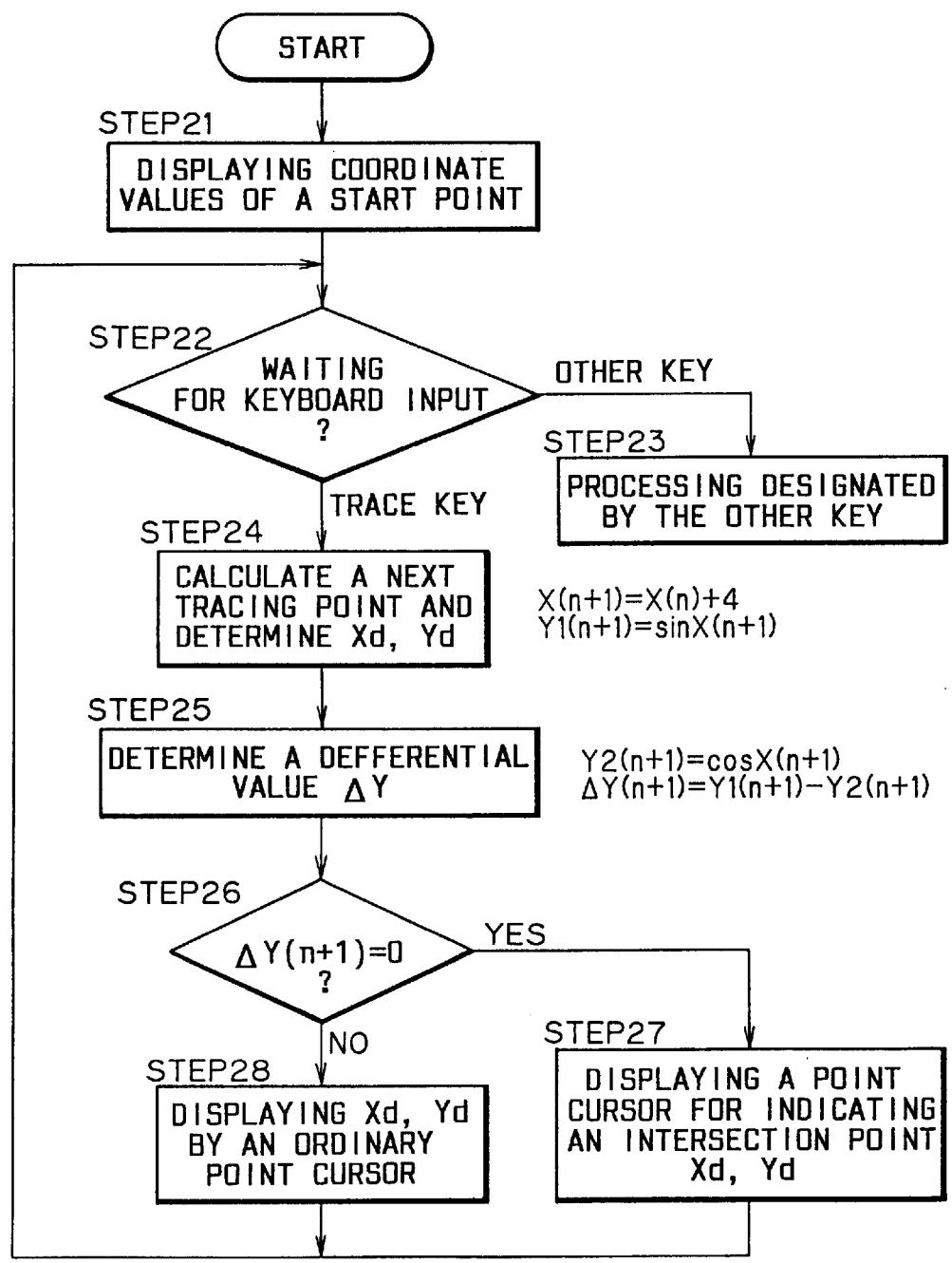
FIG. 5 is a flow chart for explaining another embodiment of the present invention.

FIG. 5 is a flow chart for explaining another embodiment of the present invention when recognizing a point at which two functional equations Y1=sin X and Y2=cos X are intersects in the process of tracing the functional equation Y1=sin X. The operation is as follows:

Tracing will be performed at a specified space between two points relative to the x-axis, which corresponds to a size of one dot on a display screen. Accordingly, a pointer (a small point of a cursor) moves every one-dot width of 4 degrees from a start point 37° on the x-axis to an end point 413° on the x-axis.

A lower limit value on the y-axis is set at −1.55 and an upper limit value on the y-axis is set at 1.55. One dot has a value of 0.05 relative to the y-axis. Such dots compose a graph of the functional equation.

At Step S21, the trace key is first pressed to indicate a cursor at a position (Xd, Yd) corresponding to a value Y1 (Y=0.60185) at the start point (X(0)=37°) and then the process advances to Step S22 for waiting for next keyboard input.

At Step S22, the process proceeds to Step S23 if a key other than the trace key is pressed and it advances to Step S24 when the trace key is pressed.

At Step S23, processing designated by the pressed key is executed. This processing is not described here.

At Step S24, a value of a next tracing point X(n+1) and a value Y1 corresponding to X(n+1) are calculated, then display position Xd, Yd corresponding to the above-mentioned calculated values are calculated. The process then proceeds to Step S25.

At Step S25, a value Y2 is determined from the value X(n+1) and a difference ΔY(n+1)=Y1−Y2 between two functional equations Y1 and Y2 is determined. The process then advances to Step S26.

At Step S26, ΔY is checked for being equal to 0 that represents an intersection point of the two functional equations. The process advances to Step S27 when ΔY is equal to 0, otherwise it proceeds to Step S28.

At Step S27, the ordinary cursor is changed to a special cursor for indicating an intersection point because the current tracing point is the point at which two functional equation curves intersect. In this instance, the position defined by Xd and Yd is indicated by a white circle. The process then returns to Step S22.

At Step S28, the current tracing point that does not relate to an intersection point is indicated by the ordinary cursor. In this instance, the position defined by Xd and Yd is indicated by a black circle. The process then returns to Step S22.

The embodiment thus enables indication of an intersection point by the special cursor by using only the trace key.

FIG. 6 is illustrative of images on a display screen while shifting a tracing point from 37°-point to 45°-point on a functional equation Y1=sin X according to the flow chart shown in FIG. 5, indicating various parameter values stored in registers. Each display-screen image represents an entire screen image of the display portion 1, whereon two curves of Y1=sin X and Y2=cos X, a cursor on the curve of Y1=sin X and coordinate values of a tracing point are indicated.

There are shown registers for storing coordinate values X(n), Y(n) and a difference ΔY between Y1 and Y2.

Figure 6A:
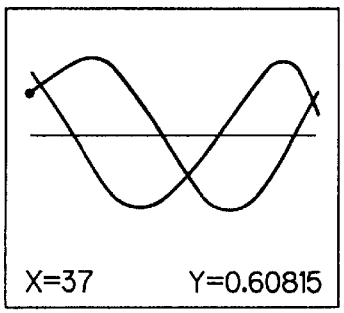
FIGS. 6A–6C are illustrative of a display screen image when tracing a functional equation $Y1=\sin X$ according to the flow chart shown in FIG. 5.

FIG. 6(A) depicts the beginning of tracing the graph with a cursor disposed at the left end of the desired functional equation. Coordinate values of current tracing point are represented as X=37 and Y=0.60815.

Figure 6B:
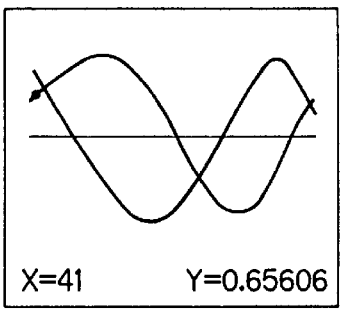

FIG. 6(B) depicts an image on the display screen when conducting ordinary tracing with a regular increment of 4 for X-value. The image relates to Step S28 in the case of taking a course of Steps S22, S24, S25, S26 and S28 of the flow chart shown in FIG. 5. In this case, X=41 and Y=0.65606 are indicated.

Figure 6C:
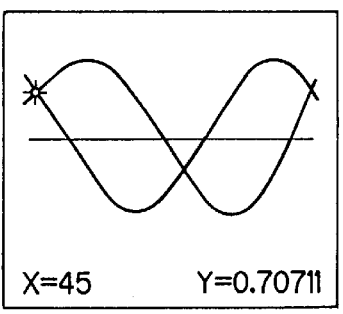

FIG. 6(C) depicts an image on the display screen in the case when the traced point was found as an intersection point in consequence of tracing with an increment of 4 for X-value. This image corresponds to Step S27 in the case of taking a course of Steps S22, S24, S25, S26 and S27 of the flow chart shown in FIG. 3. X=45 and Y=0.70711 are also shown on the screen. In this case, the cursor changes its color from black to white for easily discriminating an intersection point.

Although both embodiments perform sequential arithmetic operations to discriminate whether preset conditions exist between tracing points, it is also possible to previously calculate preset conditions and store the calculation results.

The advantages of the present invention are as follows:

(1) Any desired functional equations can be traced and displayed not only at a specified discrete space but also at a more fine discrete space as the need be. Accordingly, it is possible to discriminate whether a point displayed by a cursor is an intersection point of two functional equations or a point neighboring to the intersection point by using coordinate values of the tracing point and the intersection point. The characteristic features (e.g., an intersection point) of the functional equations can be known by using only a trace key.

(2) When a tracing point meets with preset conditions for, e.g., an intersection point, the cursor on the display screen changes its shape or color for visually indicating that the tracing point is, for example, an intersection point. The characteristic features (e.g., an intersection point) of the functional equations can be known by using only a trace key.

(3) In addition to the advantageous effects described above in item (2), a difference between traced values of respective functional equations is used in practice of determining intersections of two or more functional equations. Therefore, it is possible to easily determine whether an intersection point exists between two tracing points.

We claim:

1. A method of tracing an input functional equation on a functional calculator with a graph tracing facility, comprising steps of:

tracing an input functional equation;

determining traced values;

displaying a graph of the functional equation based on the input functional equation and the traced values; and indicating a traced point by a cursor on the graph and numerically indicating the traced values, wherein a discrete interval of coordinates of each traced point numerically indicated is a finer resolution than a discrete interval of coordinates of each traced point indicated by the cursor.

2. A method of tracing an input functional equation on a functional calculator with a graph tracing facility, comprising steps of:

tracing an input functional equation;

determining traced values;

displaying a graph of the functional equation based on the input functional equation and the traced values;

indicating a traced point by a cursor on the graph and numerically indicating the traced values, and wherein the cursor changes its color and/or shape different from a first color and shape to visually represent that the traced values agree with preset conditions defining a maximum value, minimum value and inflection point of the functional equation and an intersection point with another functional equation.

3. A method of tracing an input functional equation as defined in claim 2, wherein in processing a plurality of functional equations $Y=f(X)$ with an intersection point disposed therebetween as the preset conditions, the intersection point is determined by applying a difference $\Delta Y$ between traced values of the respective functional equations.

* * * * *